United States Patent
Liu et al.

(10) Patent No.: US 11,606,809 B2
(45) Date of Patent: *Mar. 14, 2023

(54) DUPLICATED DCI TRANSMISSION

(71) Applicant: Telefonaktiebolaget LM Ericsson (publ), Stockholm (SE)

(72) Inventors: Jinhua Liu, Beijing (CN); Shaohua Li, Beijing (CN); Zhan Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,345

(22) Filed: Jul. 13, 2021

(65) Prior Publication Data

US 2021/0345394 A1    Nov. 4, 2021

Related U.S. Application Data

(63) Continuation of application No. 16/496,704, filed as application No. PCT/SE2018/050212 on Mar. 7, 2018, now Pat. No. 11,102,804.

(60) Provisional application No. 62/476,134, filed on Mar. 24, 2017.

(30) Foreign Application Priority Data

Mar. 24, 2017    (WO) ................ PCT/CN2017/078124

(51) Int. Cl.
*H04W 72/12* (2009.01)
*H04W 72/1268* (2023.01)
*H04W 72/1273* (2023.01)

(52) U.S. Cl.
CPC .... *H04W 72/1289* (2013.01); *H04W 72/1268* (2013.01); *H04W 72/1273* (2013.01)

(58) Field of Classification Search
None
See application file for complete search history.

(56) References Cited

U.S. PATENT DOCUMENTS

| | | |
|---|---|---|
| 8,718,025 B2 | 5/2014 | Zhu et al. |
| 2011/0076962 A1 | 3/2011 | Chen et al. |
| 2011/0176507 A1 | 7/2011 | Yuk et al. |
| 2011/0243012 A1* | 10/2011 | Luo ...................... H04L 5/0055 370/252 |
| 2013/0089068 A1 | 4/2013 | Kalhan |

(Continued)

FOREIGN PATENT DOCUMENTS

| | | |
|---|---|---|
| EP | 2555458 A2 | 2/2013 |
| WO | 2011159311 A1 | 12/2011 |

*Primary Examiner* — Anh Ngoc M Nguyen

(74) *Attorney, Agent, or Firm* — Christopher & Weisberg, P.A.

(57) ABSTRACT

There is disclosed a network node for a Radio Access Network, the network node being adapted for communication utilizing a carrier aggregation comprising at least a first carrier and a second carrier. The network node is adapted for transmitting first downlink control information on the first carrier of the carrier aggregation, and second downlink control information on the second carrier of the carrier aggregation, wherein the first downlink control information and the second downlink control information pertain to transmission on the same uplink carrier.

16 Claims, 13 Drawing Sheets

(56) References Cited

U.S. PATENT DOCUMENTS

2014/0064214 A1* 3/2014 Papasakellariou .. H04W 72/042
 370/329
2016/0007373 A1 1/2016 Davydov et al.

* cited by examiner

DUPLICATED DCI TRANSMISSION

TECHNICAL FIELD

This disclosure pertains to wireless communication technology, in particular in the context of Radio Access Technology (RAT) and/or a Radio Access Network (RAN).

BACKGROUND

For some use cases in wireless communication technology, in particular in the context of URLLC (Ultra-high Reliability Low Latency Communication), a high level of reliability of data transmission is essential. Under time constraints (e.g., requirements defining that successful transmission has to be performed and/or responded to in a maximum amount of time, with low latency) typical retransmission processes (e.g., ARQ/HARQ processes) may not be able to perform as desired. Also, for some transmission types, retransmission processes may not be available, e.g., for transmission of control information (control signaling).

SUMMARY

Accordingly, it is an object of the present invention to provide approaches allowing improved transmission reliability in particular in the context of control signaling. There is described a network node for a Radio Access Network (RAN). The network node is adapted for communication utilizing a carrier aggregation comprising at least a first carrier and a second carrier. The network node further is adapted for transmitting first downlink control information on the first carrier of the carrier aggregation, and second downlink control information on the second carrier of the carrier aggregation. The first downlink control information and the second downlink control information pertain to transmission on the same uplink carrier and/or reception on the same downlink carrier. The network node may comprise, and/or be adapted for utilizing, processing circuitry and/or radio circuitry like a transmitter and/or transceiver for such transmitting. Alternatively, or additionally, the network node may comprise a transmitting module for such transmitting.

Moreover, there is disclosed a method of operating a network node in a Radio Access Network. The network node is adapted for communication utilizing a carrier aggregation comprising at least a first carrier and a second carrier. The method comprises transmitting first downlink control information on the first carrier, and transmitting second downlink control information on the second carrier. The first downlink control information and the second downlink control information pertain to transmission on the same uplink carrier and/or reception on the same downlink carrier.

A user equipment for a Radio Access Network may be considered. The user equipment is adapted for communication utilizing a carrier aggregation comprising at least a first carrier and a second carrier. The user equipment further is adapted for transmitting on an uplink carrier, and/or for receiving on a downlink receiving carrier, based on first downlink information and/or second downlink information, the first downlink information being received on the first carrier, and/or the second downlink information being received on the second carrier. The user equipment may comprise, and/or be adapted for utilizing, processing circuitry and/or radio circuitry, in particular a transmitter and/or receiver or transceiver, for such transmitting and/or for receiving the downlink information on the first and/or second carrier. Alternatively, or additionally, the user equipment may comprise a transmitting and/or receiving module for such transmitting and/or receiving, respectively.

In addition, a method of operating a user equipment in a Radio Access Network is proposed. The user equipment is adapted for communication utilizing a carrier aggregation comprising at least a first carrier and a second carrier. The method comprises transmitting on an uplink carrier, and/or receiving on a downlink receiving carrier, based on first downlink information and/or second downlink information, the first downlink information being received on the first carrier, and/or the second downlink information being received on the second carrier.

The first and second downlink control information may be considered to be duplicates and/or copies of each other, e.g., regarding their content pertaining to the uplink carrier and/or the downlink receiving carrier. In that sense, they may be considered to mirror each other. It should be noted that the first downlink control information and the second downlink control information may represent the same content pertaining to the carrier/s, but may be transmitted in different ways, e.g., pertaining to MCS and/or link adaptation scheme. However, they may also be transmitted in similar or the same way. A message or signaling on one carrier, e.g., the first or the second carrier, comprising both the first and second downlink control information may be considered to represent an information aggregate, or to comprise an aggregated copy of the information.

The network node may be adapted for, and or the method of operating the network node may comprise, configuring a user equipment for receiving, on the first and second carrier, the first respectively the second downlink control information. The network node may comprise a corresponding configuring module, and/or may be adapted for utilizing its processing circuitry and/or radio circuitry for such configuring. Receiving the first and/or second downlink control information by the user equipment may based on a configuration, which may be configured by a network node. The user equipment may be adapted for, and/or may utilize its processing circuitry and/or radio circuitry, to be configured accordingly.

A configuration may indicate how the user equipment has to evaluate the downlink control information, e.g., in which order and/or on which carriers of the carrier aggregate it has to look for the downlink control information pertaining to the same uplink and/or downlink receiving carrier. The user equipment may be adapted for, and/or the method of operating the user equipment may comprise, evaluating the first and second control information based on the configuration. The UE may be adapted to perform such evaluation, e.g., utilizing its processing circuitry and/or radio circuitry, and/or comprise an evaluating module for such evaluating.

It should be noted that it may be considered to provide more than the first and the second downlink control information pertaining to the same uplink and/or downlink carrier, e.g., third downlink information on a third carrier of the carrier aggregate, etc.

Transmitting downlink control information may comprise transmitting such information or corresponding signaling to a user equipment. Transmitting on an uplink carrier may comprise transmitting to a network node.

The uplink carrier and/or the downlink receiving carrier may be a carrier of the carrier aggregation. For example, the uplink carrier may be the first carrier or second carrier, and or associate to the first carrier or second carrier, e.g., in forming a common channel or carrier pair for uplink and downlink transmission. It may be considered that the downlink receiving carrier is a carrier of the carrier aggregation.

The downlink receiving carrier may be one of the first carrier and the second carrier, in particular the first carrier, or another downlink carrier of the carrier aggregation. Generally, the first carrier may be a primary component carrier, the second carrier may be a secondary component carrier, or vice versa.

The first and/or second downlink control information may indicate and/or schedule uplink transmission, and/or downlink reception of transmission, in particular data transmission, for the user equipment. Downlink control information scheduling downlink reception (reception of data transmitted on the downlink) may indicate resources, in particular time/frequency resources and/or one or more resource elements, when the user equipment is to expected to receive data, e.g., on a downlink data channel like a Physical Downlink Shared Channel (PDSCH). The downlink transmission of data may be on the downlink receiving carrier.

It may be considered that the first downlink control information is comprised in a first downlink control message, and/or the second downlink control information is comprised in a second downlink control message. Alternatively, the information may be divided over several messages. In particular, the first downlink control information may be comprised in a DCI structure (e.g., comprising one or more messages or signals) or message, and/or the second downlink control information may be comprised in a DCI structure or message (e.g., comprising one or more messages or signals). DCI (Downlink Control Information) may pertain to specific format/s for the downlink control information, in particular according to a standard like a 3GPP standard, for example LTE or NR.

The first downlink control information and/or the second downlink control information may indicate scheduling of transmission on the uplink carrier. Scheduling of transmission may for example indicate which resource/s (e.g., time/frequency resource/s, e.g., resource element/s) to use for transmission, which kind of transmission is scheduled (e.g., related to which channel/s is or are scheduled for transmission, and/or which kind of signaling is scheduled, etc.). In some variants, the downlink control information may indicate power and/or coding resources for the transmission. In some variants, the first downlink control information may be in the same format (e.g., DCI format as defined according to a standard) as the second downlink control information. Such a format may describe the internal structure of the information, e.g., pertaining to the arrangement and/or meaning of bits and bit fields.

There may be considered a program product comprising instructions causing processing circuitry to control and/or perform any one of the methods described herein.

Also, a carrier medium arrangement carrying and/or storing a program product as described herein may be considered.

Communication utilizing a carrier aggregation may comprise transmitting and/or receiving on one or more carriers of the aggregation. A carrier aggregation may in particular comprise the first and second carrier as component carriers, e.g., for downlink. It may comprise one or more component carriers for uplink, or use one or more of the downlink component carriers also for uplink, e.g., in frequency division and/or time division.

Downlink control information may represent signaling indicating control information, which may be transmitted on the downlink. In some variants, downlink control information may represent and/or comprise and/or indicate scheduling information and/or power control information and/or information pertaining to transmission mode or level and/or information pertaining to link adaptation and/or modulation and scheduling and/or beamforming. Downlink control information may pertain to a specific carrier (e.g., uplink carrier), or to more than one carrier. In the latter case, it may be considered that downlink control information (e.g., in a specific message) comprises two components, e.g., first downlink control information and second downlink control information.

Generally, first downlink control information may be transmitted on one (downlink, e.g., the first) carrier together with the second downlink control information, for example in the same message.

It may be considered that downlink control information pertaining to transmission on an uplink carrier indicates resources, in particular time/frequency resources, for transmission on that carrier, and/or indicates which channel to use for transmission on that carrier (e.g., Physical Uplink Shared CHannel, PUSCH, and/or Physical Uplink Control Channel, PUCCH) and/or what to transmit, e.g., data (in particular user data) and/or control signaling/information with the transmission. Some indications may be redundant, e.g., an indication of transmission of control signaling may indicate use of PUCCH in some variants. Other transmission parameters pertaining to transmission on the (uplink) carrier may be indicated additionally or alternatively, e.g., pertaining to power and/or beamforming and/or modulation and coding scheme (MCS).

In some variants, the first downlink control information may be transmitted on the first carrier and the second carrier, and the second downlink control information may be transmitted on the first carrier and the second carrier. In particular, there may be transmitted a first message or message structure on the first carrier, the first message or message structure comprising the first and second downlink information. A second message or message structure may be transmitted on the second carrier, the second message or message structure comprising the first and second downlink information. A message structure may comprise one or more messages and/or information blocks. The message or message structure may be transmitted and/or associated to a specific carrier, e.g., the first message structure to the first carrier, and/or the second message structure to the second carrier.

Downlink control information pertaining to a carrier may pertain to (e.g., user) data transmission on that carrier, e.g., one or more data packets and/or transport blocks of data to be transmitted.

The (first and/or second) downlink control information, and/or the transmission on the uplink carrier, may pertain to URLLC data, e.g., one or more corresponding URLLC data packets.

It may be considered that whether to transmit the first and second downlink control information, and/or whether to transmit on the uplink carrier based on the first and/or second downlink control information, is determined based on a transmission mode or transmission level. For example, such determination may be for specific transmission mode/s and/or level/s, e.g., such with strong latency requirement/s (e.g., low latency), in particular for URLLC (Ultra-Reliable Low Latency Communication). A transmission level may be based on, and/or pertain to a reliability level and/or latency level. Such a level (or levels) may be represented or indicated by a corresponding indication or indicator, and/or be associated to or pertain to the data to be transmitted using the one or more data streams. A level or indication may be indicated directly/explicitly, or indirectly/implicitly. A reliability level may be indicated by, and/or represent, a desired and/or required error rate and/or error probability, for example a Block Error Rate (BLER), and/or indicate a maximum number of errors or some similar. A latency level may indicate a desired or required latency and/or response speed. A transmission level may for example be indicated by a quality of service requirement and/or indication, and/or the number of data streams associated to transmitting the data and/or a transmission mode. A transmission level may for example indicate Ultra Reliable Low Latency Communication (URLLC). There may be defined different transmission levels, with several levels of reliability and/or latency. Whether to transmit the first and second downlink control information may be determined based on an indication indicating the transmission level for the data (e.g., relating to a bearer or channel associated to the data). Such an indication, in particular a transmission level indication, may be provided for, and/or pertain to, a bearer and/or logical or transport channel.

Signaling, or a message, comprising scheduling information and/or acknowledgement signaling may be considered and/or implemented as one or more control information messages. For example, a downlink control information/ Downlink Control Information (DCI) message and/or a scheduling message (which may schedule and/or indicate scheduling intention for a data element and/or stream) may be considered examples of such control information messages. A message of, and/or comprising, acknowledgment signaling may generally also be considered a control information message. Examples of such a control information message comprise Uplink Control Information (UCI) messages, and/or acknowledgement messages. Control signaling may be considered signaling of, and/or comprising, control information. Control information may be provided in a control information message. Control information may comprise a retransmission indication (e.g., ACK/NACK and/or NDI), and in some variants in addition scheduling information like a grant (of uplink and/or downlink resource/s), e.g., for the downlink or downlink control information. In other cases, control information may comprise acknowledgement signaling (respectively, associated acknowledgement information), and in some variants in addition scheduling requesting information and/or measurement-related information, e.g., for the uplink or uplink control information.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling may comprise a plurality of signals and/or messages, which may be transmitted on different carriers and/or be associated to different acknowledgement signaling processes, e.g., representing and/or pertaining to one or more such processes. An indication may comprise signaling and/or a plurality of signals and/or messages, which may be transmitted on different carriers and/or be associated to different acknowledgement signaling processes, e.g., representing and/or pertaining to one or more such processes.

A radio node may generally be considered a device or node adapted for wireless and/or radio (and/or microwave) frequency communication, and/or for communication utilizing an air interface, e.g., according to a communication standard.

A radio node may be a network node, or a user equipment or terminal. A network node may be any radio node of a wireless communication network, e.g., a base station and/or eNodeB or gNodeB (gNB) and/or relay node and/or micro/ nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Processing circuitry may be connected or connectable to radio circuitry (and/or comprised therein) to control operation thereof.

Radio circuitry may comprise one or more transmitters and/or receivers and/or transceivers (a transceiver may operate or be operable as transmitter and receiver), and/or corresponding circuitry. It may be considered that radio circuitry may comprise one or more amplifiers and/or oscillators and/or filters and/or corresponding circuitry, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g., different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g., according to NR or LTE, in particular LTE Evolution.

BRIEF DESCRIPTION OF THE DRAWINGS

The drawings are provided to illustrate the concepts and approaches described herein and are not intended to limit them unless specifically stated otherwise. The drawings comprise:

FIG. 8, showing an exemplary method of operating a user equipment;

FIG. 9, showing an exemplary user equipment;

FIG. 10, showing an exemplary method of operating a network node; and

FIG. 11, showing an exemplary network node.

DETAILED DESCRIPTION

Figure 1:
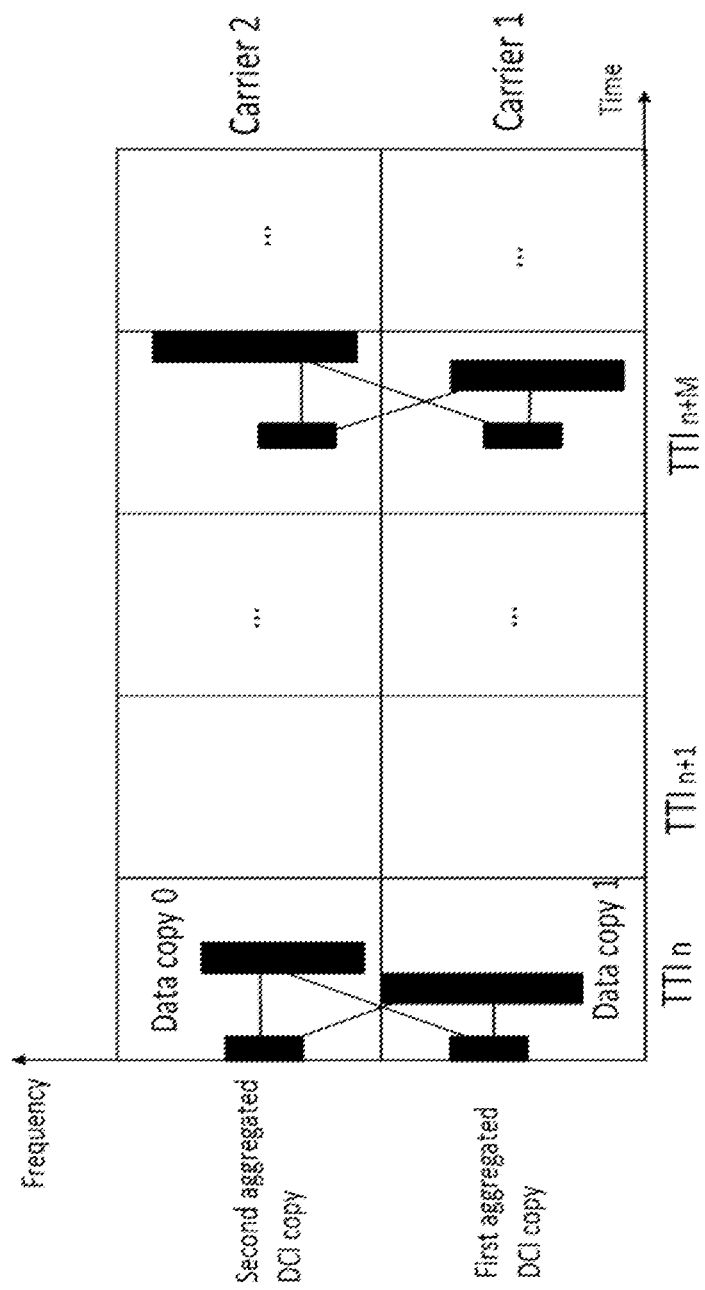
FIG. 1, showing exemplary DCI duplication for TTI bundling with frequency hopping in case of CA.

Approaches for downlink control information, in particular DCI, reliability enhancement in particular for duplicated scheduling of transmission are investigated.

URLLC traffic has been identified as one key traffic to be served in NR. Compared to eMBB (evolved Mobile BroadBand) traffic, there are the following characteristics for URLLC:

the data packet for URLLC traffic is much smaller;
the data packet arrival is much sparser;
Much lower delay budget over the air interface (low latency).
Low MAC delay requirement in air interface and possibly RLC/PDCP ARQ not applicable.

The reliability for URLLC may in some variants rely on the transmission schemes in the MAC (Medium Access Control) layer.

For data duplication in MAC in case of CA, it is possible to perform soft combining of the soft information received over different carriers for the same data block, so that both soft combining gain and the frequency diversity gain can be achieved. Soft combining may be used for example in the context of a HARQ (Hybrid Acknowledgement Repeat reQuest) scheme.

Usually, transmission of downlink control information, e.g., on PDCCH, requires higher reliability than data transmission. Misdetection of downlink control information, e.g., on PDCCH, may result in considerable delay if a UE misses a DCI for UL scheduling of a URLLC packet. Various methods such as duplicated transmission in case of CA or DC (Dual Connectivity) are considered to enhance the reliability in particular for downlink control information. Further enhancement of PDCCH is considered, e.g., in a preferred case, in addition to the maximum aggregation level extension.

There is generally proposed to provide duplicated downlink control information, e.g., PDCCH, transmission in case of CA to enhance the PDCCH transmission reliability in addition to an aggregation level expansion. Multiple copies of signaling carrying the same DCI components may be built to be transmitted over different carriers so that frequency (path) diversity gain can be achieved. The reliability of transmission of downlink control information or PDCCH may be improved, allowing enhancing the data transmission reliability within a tight delay budget.

There is generally described transmitting downlink control information (it is exemplarily referred to DCI as an example thereof) duplications across carriers in case of carrier aggregation to enhance the scheduling of data transmission for both uplink and downlink.

A DCI may be transmitted in multiple copies in different carriers. The UE shall decode the DCIs over these carriers. If there are DCI copies received from multiple carriers, the UE shall compare the DCIs and determine if the received DCIs schedules the same data transmission (UL) or DL receiving or other functions. Then the UE act properly accordingly.

In the following, the exemplary DCI duplication methods are described in different conditions.

DCI duplication for UL scheduling is described as an example.

For UL scheduling, missing of UL grant may result in long transmission delay or even data miss. For instance, if the UE misses the UL grant, data transmission will not happen and the network node (e.g., gNB) has to send another DCI to schedule the data transmission if delay is tolerable; if the delay is not tolerable, the data is missed. In this case, the PDCCH robustness enhancement is meaningful.

In case of CA, it can be configured to transmit duplicated DCI copies in multiple carriers to schedule transmissions requested by an UE. The UE can perform the data transmission accordingly if any copy is received.

There are different behaviors for a UE to search the DCI when DCI duplication is configured. It can be either predefined or preconfigured via RRC signaling so that the UE can know which option is to be used. The following options describe possible variants for the UE to evaluate downlink control information. The options are described in the context of DCI and for uplink transmission, but are not limited to DCI, or to uplink transmission, but may be applied to downlink control information in general, and/or for downlink transmission.

Option 1: Dynamic DCI duplication on a basis of case by case: The UE may perform (e.g., blind) detection for DCI in all carriers configured for DCI transmission. If more than one DCI pertaining to the same (UL/DL) carrier, e.g., of the same PDCCH format, is received in different carriers, the UE shall perform as instructed by the DCI if its decoding succeeds. The UE may be configured to compare the DCI information of more than one such DCI, e.g., of the same format, to determine if these DCIs are used to schedule the same data transmission based on preconfigured/predefined rules, e.g., either indicators in the DCI or whether a same physical resource allocation is granted before determining the data transmission. Data transmission (in the uplink) or reception may be scheduled accordingly.

Option 2: Semi-static DCI duplication: The UE may perform (e.g., blind) detection for DCI according to predefined/preconfigured order (e.g., first carrier, second carrier, and/or first primary carrier, second secondary carrier). If the DCI for scheduling the UL data transmission (or DL reception) is detected, the UE may skip the blind detection of DCI in other carrier for DCI transmission. Otherwise, the UE may continue to search DCI over the second/secondary carrier until all carrier for DCI carrying has been searched or the DCI for data scheduling is detected. This approach can save the UE power for blind detection.

Option 3: UE autonomous selection based reception: It can be preconfigured or the UE can determine the order to perform the (e.g., blind) detection of DCI across carriers. The network node (e.g., gNB) can put the DCI transmission at least in the best carrier if DCI duplication is applied. The UE performs the DCI detection across carriers according to the radio quality descending order. Both the UE and the network node (e.g., gNB) can determine the radio quality of carriers according to the CQI/RSRP/RSRQ report by the UE.

Regarding the network node (referred to exemplarily as gNB), there may be considered the following aspects for configuring. Generally, configuring the user equipment may be based on a radio quality and/or channel quality and/or channel conditions and/or BLER and/or missing rate and/or channel state information and/or measurement reports and/or measurement results, in particular pertaining to one or more carriers of the CA.

As a first aspect, the gNB can semi-statically configure the UE if the DCI duplication is to be applied or not. For instance, the gNB may enable/disable the DCI duplication according to the radio quality of the carriers (or the BLER, estimated PDCCH missing rate). If the filtered CQI of the best carrier for DCI carrying is lower than a first threshold, the DCI duplication is configured. If the filtered CQI of the best carrier for DCI carrying is higher than a second threshold (>=first threshold), the DCI duplication is not used and the DCI is transmitted over the best carrier without duplication. When the DCI duplication is disabled, the gNB shall configure which carrier is still used for DCI carrying.

As a second aspect, when DCI duplication is configured for a UE, e.g., activated or deactivated dynamically (i.e. turned on for UE being at cell-edge or for URLLC traffic relevant DCI), the gNB may conditionally determine if to transmit multiple DCI copies in different carriers or single copy in a carrier based on the channel radio quality. For instance, if the CQI (Channel Quality Indicator, a measure of channel quality) of the first/primary carrier is higher than a predefined threshold, the gNB can only transmit DCI over the primary carrier without DCI duplication across carriers; if the CQI of the primary carrier is lower than predefined threshold while the CQI of the secondary carrier configured for DCI carrying is higher than the predefined threshold, the gNB only transmit DCI over the secondary carrier without DCI duplication; If the CQIs of the primary and the secondary carrier are lower than the predefined threshold, DCI duplications are transmitted across carriers.

In implementation, one of options of DCI duplication is that a mirrored DCI physical data signal is transmitted on one CC as it is at another one. One direct merit of this is a soft-combination in physical signal processing could be easily done to optimally achieve the duplication gain via coherent combining of received signal replicated after channel equalization.

A variant of the above mirroring of the PDCCH over CCs is partially mirrored PDCCH over CCs, at which case, only part of PDCCH are same (mirrored) and other part of PDCCH are not same to balance the overall spectrum efficiency and control signal duplication gain for certain traffics or certain UEs only. For example, certain PDCCH PRBs are configured to be mirrored while others are not. For certain OFDM symbols mirrors in their signals while others do not.

Configuration of such different PDCCH definition in term of physical resources could be deliberately different to different UEs or different DRBs for a same UE to differentiate the PDCCH reliability. This may be determined by the gNB and shared (configured) to UEs for proper operation.

It may be considered that a PDCCH herein may represent a transmission of downlink control information or signaling, e.g., in a message transmitted on the PDCCH.

Below are some other examples for duplicated DCI transmissions:

FIG. 1 shows one example to schedule the UL transmission in TTI bundling with duplicated transmission of aggregated DCI. That is, each of aggregated DCIs holds a full info to instruct cross-CC duplications of one data block as illustrated by FIG. 1.

Figure 2:
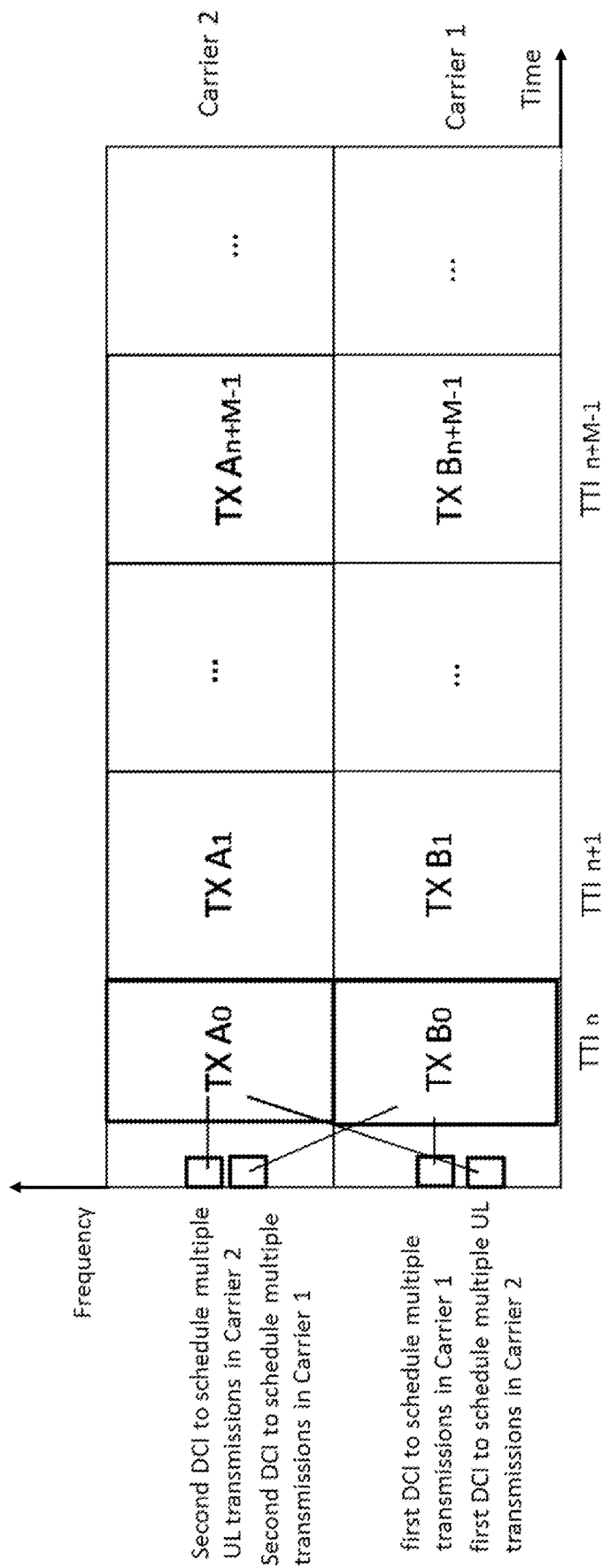
FIG. 2, showing DCI duplication for multiple subframe scheduling in case of CA.

FIG. 2 shows one example to schedule multiple subframe transmissions in UL via DCI duplication. Since missing of the DCI means a waste of multiple subframes, DCI transmission is enhanced via duplication in multiple carriers. For unlicensed operation, this method is especially useful since multiple subframe scheduling shall be usually used for high data rate calculation.

Figure 3A:
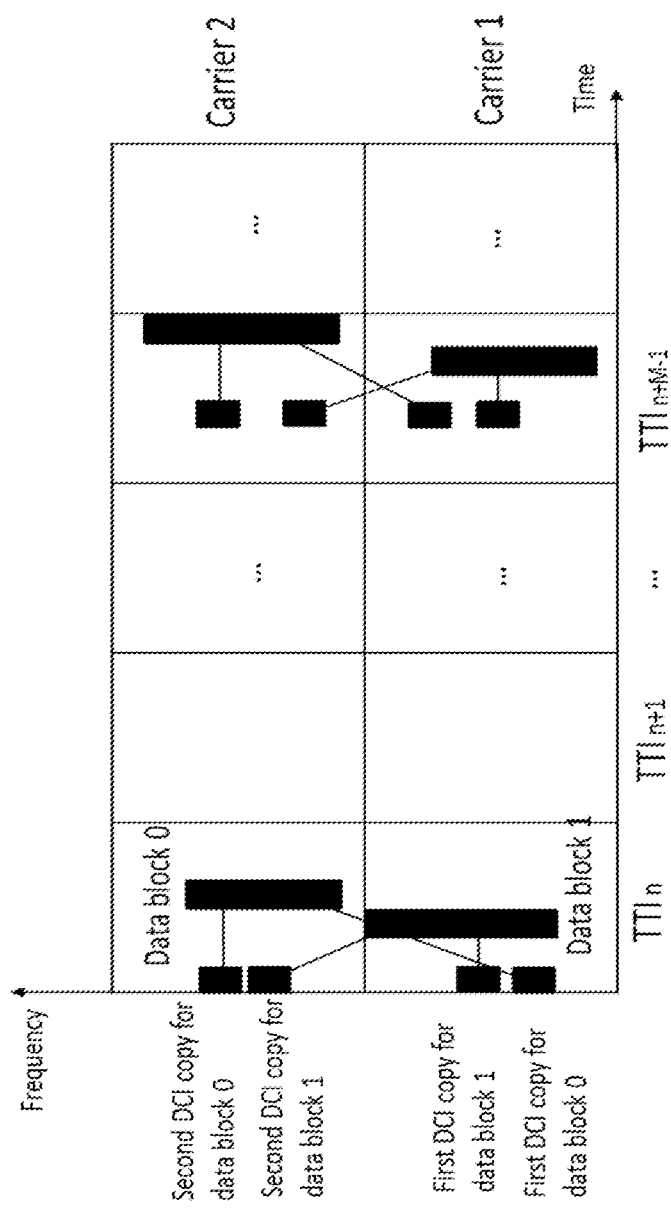
FIGS. 3a-c, showing different scenarios for DCI duplication.
Figure 3B:
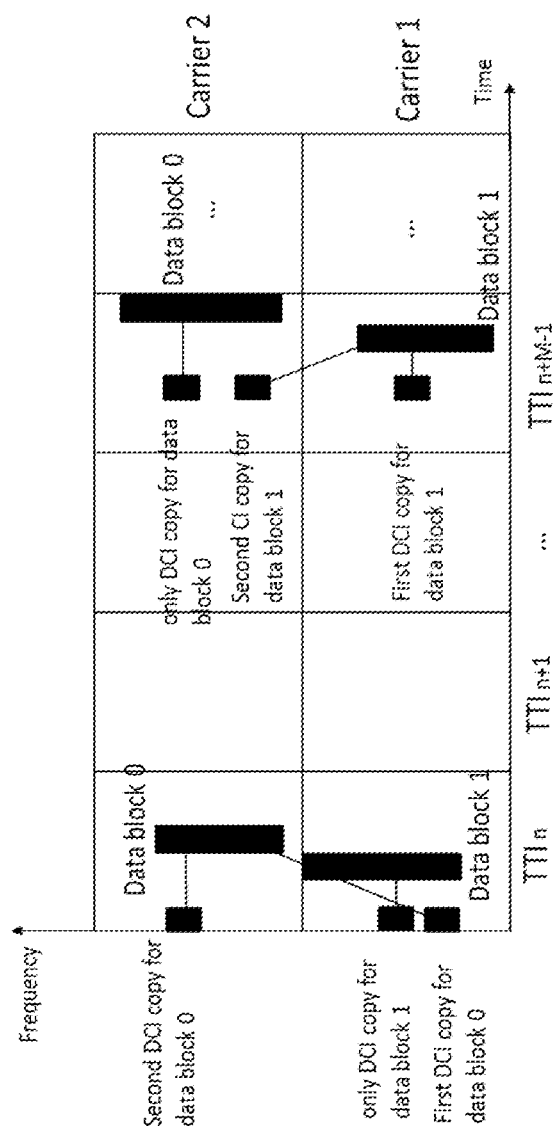
Figure 3C:
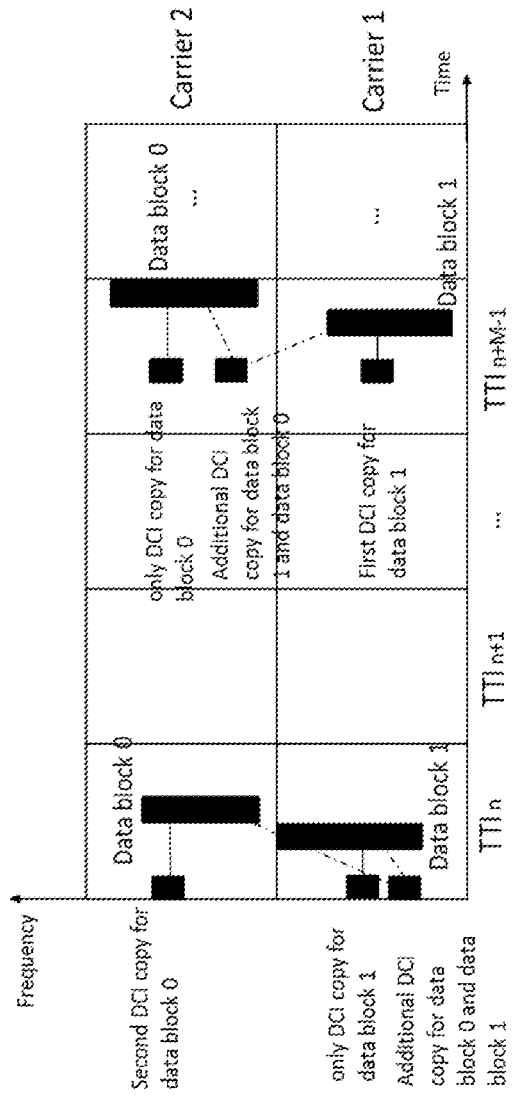

FIGS. 3*a-c* show examples to schedule single UL data transmission via DCI duplication. FIG. 3*a* shows that DCI duplication is always applied. FIG. 3*b* and FIG. 3*c* shows that DCI duplication is applied adaptively according to the channel quality variations. For FIG. 3*c*, besides the DCI for data block 0 and data block 1, additional DCI is transmitted. From this additional DCI. The DCI information for data block 0 and data block 1 can be extracted.

DCI duplication for DL scheduling is described as an example.

Similarly, DCI transmission methods can be applied for DL data transmission. A possible case to use the DCI duplication is across carriers using the aggregated DCI.

Figure 4:
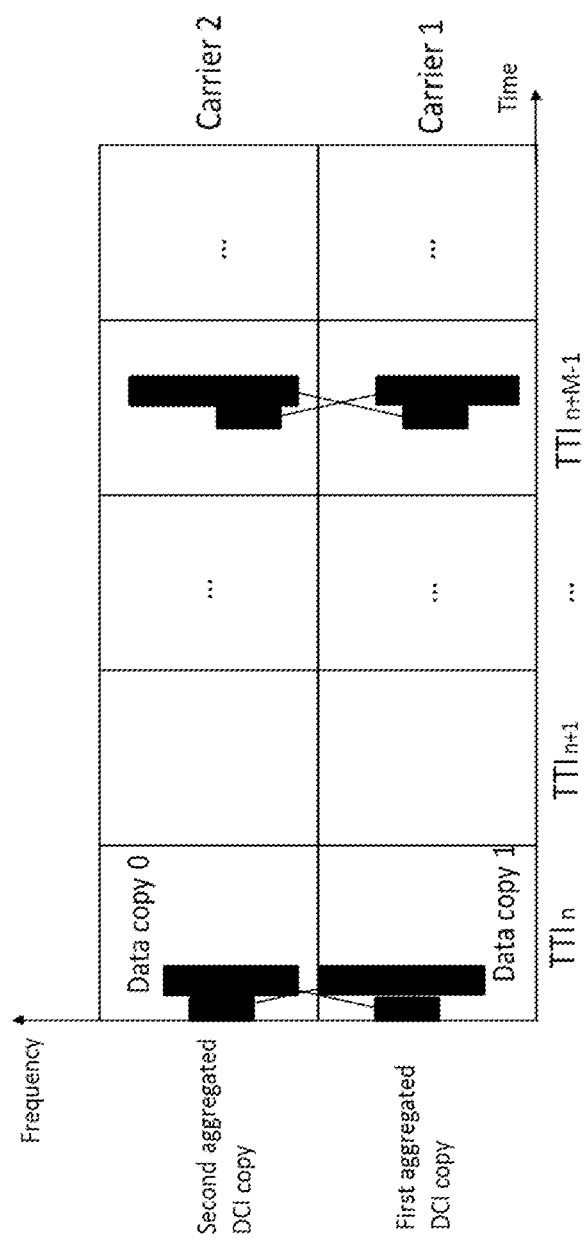
FIG. 4, showing exemplary DCI duplication with aggregated DCI transmission for DL data transmission.

FIG. 4 shows that the aggregated DCI (representing downlink control information) is transmitted two times (as first DCI and second DCI) in different carriers. The UE can determine the information for data receiving over two carriers if either of the DCI copies is received. Other use cases for DL data transmission may be determined analogously to the examples for UL scheduling.

DCI duplication to transmit the PDCCH order in case of CA is proposed.

In addition to DCI duplication for scheduling of data transmissions, the system can apply DCI duplication for important information transmission. For one example, the eNB/gNB can configure to use DCI duplication for PDCCH order transmission. Thus, different kinds of downlink control information may be duplicated.

Examples of DCI duplication methods are described.

There are multiple ways for transmitting the first and second downlink control information, which may be referred to as, and/or comprise, multiple or various (e.g., DCI) duplication methods or multiplexing of downlink control information in the following. In one way, multiple (two or more) DCIs corresponding to multiple carriers are multiplexed into one combined PDCCH. The combined PDCCH is transmitted in multiple component carriers. Thus, there are provided messages each comprising the first and second downlink control information.

In one exemplary way for the multiplexing, all the fields of single component carrier DCI may be duplicated in the combined PDCCH.

In another exemplary way of the multiplexing, some fields of single component carrier DCI may be merged as common fields in the combined PDCCH; and/or some fields of single component carrier DCI may be duplicated in the combined PDCCH; and/or some fields of the combined PDCCH is the new fields which are not included in the single component carrier DCI. An example of this duplication method is shown in FIG. 1.

As another way, the DCI for different component carriers may be encoded separately in different PDCCHs, corresponding to single component carrier DCI, and the PDCCH is duplicated and transmitted as shown in FIG. 2 and FIG. 3.

Figure 5:
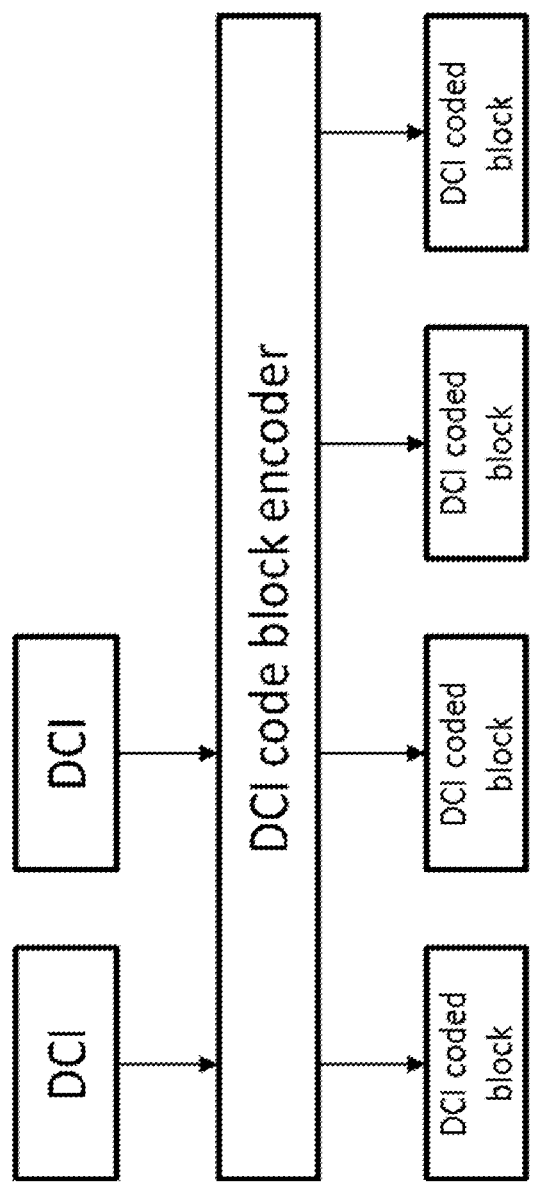
FIG. 5, showing exemplary block-based encoding of DCI.

As another way, the DCI for different component carriers may be encoded jointly, shown exemplarily in FIG. 5. Instead of replicating the same data for all DCI transmissions, it may be considered introducing a block coding stage for the DCIs transmission. The K independent DCIs are encoded and generated into K+L DCIs, and the K+L DCIs are transmitted over multiple component carriers. At the receiver side, the DCI for each component carrier can be recovered if at least K DCI are successfully received. One simple example of this for the case of two DCIs are encoded and generated into an additional block as the sum of the 2 DCIs (parity code). In the case of more DCIs, codes such as Reed-Solomon or fountain codes could be used. When any two of the transmitted DCIs are received, the DCI for each component carrier can be extracted. Thus the robustness of the DCI transmission may be improved.

Figure 6:
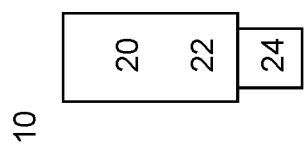
FIG. 6, showing an exemplary user equipment.

FIG. 6 schematically shows a terminal or wireless device 10, which may be implemented as a UE (User Equipment). Terminal 10 comprises processing circuitry (which may also be referred to as control circuitry) 20, which may comprise a controller connected to a memory. Any module of the terminal, e.g., a transmitting module or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g., a RAN as described herein. Terminal 10 may generally be adapted to carry out any of the methods of operating a terminal or UE disclosed herein; in particular, it may comprise corresponding circuitry, e.g., processing circuitry, and/or modules.

Figure 7:
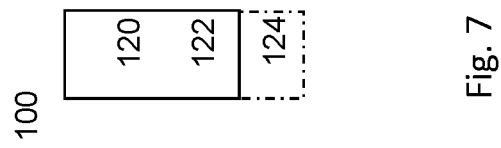
FIG. 7, showing an exemplary network node.

FIG. 7 schematically show a network node 100, which in particular may be an eNB, or gNB or similar for NR. Network node 100 comprises processing circuitry (which may also be referred to as control circuitry) 120, which may comprise a controller connected to a memory. Any module, e.g., transmitting module and/or receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g., processing circuitry, and/or modules. The antenna 124 circuitry may be connected to and/or comprise an antenna array. The network node 100, respectively its circuitry, may be adapted to transmit configuration data and/or to configure a terminal as described herein.

FIG. 8 shows a diagram for an exemplary method of operating a user equipment. The method comprises an action TS10 of transmitting on an uplink carrier and/or receiving on a downlink receiving carrier as described herein.

FIG. 9 shows a schematic of an exemplary user equipment. The user equipment may comprise a transmitting and/or receiving module TM10 for performing action TS10.

FIG. 10 shows a diagram for an exemplary method of operating a network node. The method comprises an action NS10 of transmitting first and second downlink control information as described herein.

FIG. 11 shows a schematic of an exemplary network node. The network node may comprise a transmitting module NM10 for performing action NS10.

There is generally considered a program product comprising instructions adapted for causing processing and/or control circuitry to carry out and/or control any method described herein, in particular when executed on the processing and/or control circuitry.

Also, there is considered a carrier medium arrangement carrying and/or storing a program product as described herein. A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g., radio waves or microwaves, and/or optically transmissive material, e.g., glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g., LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g., a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to transmission from one terminal to another. Transmitting acknowledgement signaling may be in downlink, uplink or sidelink, and/or may pertain to a corresponding data stream or data element in uplink, downlink or sidelink, respectively.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g., as defined by a standard. A carrier may define a frequency and/or frequency band for transmission and/or reception. In some variants, a signal (jointly encoded/modulated) may cover more than one resource elements. A resource element may generally be as defined by a corresponding standard, e.g., NR or LTE. A resource generally may represent a time-frequency resource, on which signaling according to a specific format may be transmitted and/or be intended for transmission. The format may comprise one or more substructures, which may be considered to represent a corresponding sub-resource (as they would be transmitted in a part of the resource).

Control information or a control information message or corresponding signaling may be transmitted on a control channel, e.g., a physical control channel, which may be a downlink channel or uplink channel. For example, the acknowledgement signaling and/or the retransmission indication may be signaled by a network node on PDCCH (Physical Downlink Control Channel) and/or a PDSCH (Physical Downlink Shared Channel) and/or a HARQ-specific channel. Acknowledgement signaling and/or the retransmission indication may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling. Data may be transmitted on associated channels, e.g., PUSCH or PDSCH. Different PUSCH/PDSCH or PUCCH/PDCCH channels may be associated to different carriers of a CA.

The term transmission time interval (TTI) may correspond to any time period over which a physical channel can be encoded and optionally interleaved for transmission. The physical channel may be decoded by the receiver over the same time period (T0) over which it was encoded. Examples of TTI comprise short TTI (sTTI), transmission time, slot, sub-slot, mini-slot, mini-subframe etc. A TTI may comprise a one or more symbol time intervals, and/or one or two slot time intervals, wherein e.g., 7 symbol time intervals may correspond to a slot time interval. Time interval-related terms may be considered to follow 3GPP nomenclature. A mini-slot or shortened slot or short TTI may correspond to a plurality of symbol time intervals, e.g., 2 or 3 or 4 or 5 or 6 or 7 symbol time intervals.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node. A network node may utilize, and/or be adapted to utilize, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g., downlink data and/or downlink control signaling and/or DCI and/or uplink signaling, in particular acknowledgement signaling, and/or configuring resources and/or a resource pool therefor.

A carrier may generally represent a frequency range or band. It may be considered that a carrier comprises a plurality of subcarriers. A carrier may have assigned to it a central frequency or center frequency interval, e.g., represented by one or more subcarriers (to each subcarrier there may be generally assigned a frequency bandwidth or interval). Different carriers may be non-overlapping, and/or may be neighboring in frequency space.

It should be noted that the term "radio" in this disclosure may be considered to pertain to wireless communication in general, and may also include wireless communication utilizing microwave frequencies.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

Control information or a control information message or corresponding signaling may be transmitted on a control channel, e.g., a physical control channel, which may be a downlink channel or uplink channel. For example, the downlink control information may be signaled by a network node on PDCCH (Physical Downlink Control Channel) and/or a PDSCH (Physical Downlink Shared Channel) and/ or a HARQ-specific channel. Uplink control signaling, e.g., a grant request (for resource/s) and/or acknowledgement signaling (e.g., ARQ/HARQ-related) and/or measurement-related signaling like measurement reporting, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting in downlink may pertain to transmission from the network or network node to the terminal. Transmitting in uplink may pertain to transmission from the terminal to the network or network node.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g., DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g., be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g., one or more PCCs and one PCC and one or more SCCs. Channels described herein may be defined and/or utilized on one or more carriers of the carrier aggregation. A carrier aggregation may comprise one or more carriers for uplink and/or one or more carriers for downlink, and/or one or more carriers for uplink and downlink (e.g., with subcarriers distributed between uplink or downlink, and/or in the context of Time Division Duplexing, TDD).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g., a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

What is claimed is:

1. A network node for a radio access network, the network node being configured to communicate utilizing a carrier aggregation comprising at least a first carrier and a second carrier, the network node comprising transmitter circuitry and processing circuitry operatively coupled to the transmitter circuitry, whereby the network node is configured to:
transmit first downlink control information on the first carrier of the carrier aggregation, and second downlink control information on the second carrier of the carrier aggregation, the first downlink control information and the second downlink control information pertaining to transmission on the same uplink carrier and/or to reception on the same downlink receiving carrier.

2. The network node of claim 1, wherein the downlink receiving carrier is the first carrier.

3. The network node of claim 1, wherein the first downlink control information is comprised in a first downlink control message, and/or the second downlink control information is comprised in a second downlink control message.

4. The network node of claim 1, wherein the first downlink control information and/or the second downlink control information indicate scheduling of transmission on the uplink carrier and/or reception on the downlink receiving carrier.

5. A method of operating a network node in a radio access network, the network node being configured to communicate utilizing a carrier aggregation comprising at least a first carrier and a second carrier, the method comprising:
transmitting first downlink control information on the first carrier, and transmitting second downlink control information on the second carrier, the first downlink control information and the second downlink control information pertaining to transmission on the same uplink carrier and/or reception on the same downlink receiving carrier.

6. The method of claim 5, wherein the downlink receiving carrier is the first carrier.

7. The method of claim 5, wherein the first downlink control information is comprised in a first downlink control message, and/or the second downlink control information is comprised in a second downlink control message.

8. The method of claim 5, wherein the first downlink control information and/or the second downlink control information indicate scheduling of transmission on the uplink carrier and/or reception on the downlink receiving carrier.

9. A user equipment for a radio access network, the user equipment being configured to communicate utilizing a carrier aggregation comprising at least a first carrier and a second carrier, the user equipment comprising transmitter and receiver circuitry and processing circuitry operatively coupled to the transmitter and receiver circuitry, whereby the user equipment is configured to:

transmit on an uplink carrier and/or receive on a downlink receiving carrier, based on first downlink control information and/or second downlink control information, the first downlink control information being received on the first carrier and/or the second downlink control information being received on the second carrier, the first downlink control information and the second downlink control information pertain to transmission on the same uplink carrier and/or to reception on the same downlink receiving carrier.

10. The user equipment of claim 9, wherein the downlink receiving carrier is the first carrier.

11. The user equipment of claim 9, wherein the first downlink control information is comprised in a first downlink control message, and/or the second downlink control information is comprised in a second downlink control message.

12. The user equipment of claim 9, wherein the first downlink control information and/or the second downlink control information indicate scheduling of transmission on the uplink carrier and/or reception on the downlink receiving carrier.

13. A method of operating a user equipment in a radio access network, the user equipment being configured to communicate utilizing a carrier aggregation comprising at least a first carrier and a second carrier, the method comprising:

transmitting on an uplink carrier and/or receiving on a downlink receiving carrier, based on first downlink control information and/or second downlink control information, the first downlink control information being received on the first carrier and/or the second downlink control information being received on the second carrier, the first downlink control information and the second downlink control information pertaining to transmission on the same uplink carrier and/or to reception on the same downlink receiving carrier.

14. The method of claim 13, wherein the downlink receiving carrier is the first carrier.

15. The method of claim 13, wherein the first downlink control information is comprised in a first downlink control message, and/or the second downlink control information is comprised in a second downlink control message.

16. The method of claim 13, wherein the first downlink control information and/or the second downlink control information indicate scheduling of transmission on the uplink carrier and/or reception on the downlink receiving carrier.

* * * * *